United States Patent [19]

Hurst

[11] Patent Number: 4,534,443

[45] Date of Patent: Aug. 13, 1985

[54] FOLDABLE THROTTLE CONTROL LINKAGE FOR A TILTABLE TRUCK CAB

[75] Inventor: Stanley A. Hurst, Plainfield, Ill.

[73] Assignee: International Harvester Company, Chicago, Ill.

[21] Appl. No.: 550,154

[22] Filed: Nov. 9, 1983

[51] Int. Cl.³ .............................................. B60K 19/02
[52] U.S. Cl. ...................................... 180/328; 74/512
[58] Field of Search .................... 180/328, 77; 74/512, 74/513, 522

[56] References Cited

U.S. PATENT DOCUMENTS

| | | | |
|---|---|---|---|
| 2,762,481 | 9/1956 | Sheerin | 192/94 |
| 2,914,130 | 11/1959 | Turlay | 180/77 |
| 2,939,541 | 6/1960 | Smalley | 180/89 |
| 3,165,164 | 1/1965 | Hostetler | 180/89 |
| 3,237,478 | 1/1966 | Jewell | 74/513 |
| 3,329,229 | 7/1967 | Mukho | 180/77 |
| 3,390,734 | 7/1968 | Sheerin | 180/77 |
| 3,476,202 | 11/1969 | Dudley | 180/77 |
| 3,765,500 | 10/1973 | Reeves | 180/89 |
| 3,869,937 | 3/1975 | Ahrens | 74/482 |
| 3,939,726 | 2/1976 | Ahrens | 74/513 |
| 4,086,823 | 5/1978 | Fatur | 74/512 |
| 4,156,474 | 5/1979 | Aida | 180/77 |
| 4,157,740 | 6/1979 | Jackson | 180/77 |
| 4,276,953 | 7/1981 | Penzotti | 180/328 |

FOREIGN PATENT DOCUMENTS 2326207 12/1974 Fed. Rep. of Germany ...... 180/328

Primary Examiner—Joseph F. Peters, Jr.
Assistant Examiner—Ross Weaver
Attorney, Agent, or Firm—F. David AuBuchon; Dennis K. Sullivan

[57] ABSTRACT

A throttle controlling system in a cab-over-engine truck for a positive and remote transmission of a accelerator pedal displacement to an engine mounted fuel control lever. The link system permits raising of the cab into its tilted position without disconnecting of any part of the link system by simply folding out the members thereof. The link system also facilitates a cab isolation from vibration and hunting of the truck frame by a scissor-like geometrical composition and relative motion of its components.

10 Claims, 5 Drawing Figures

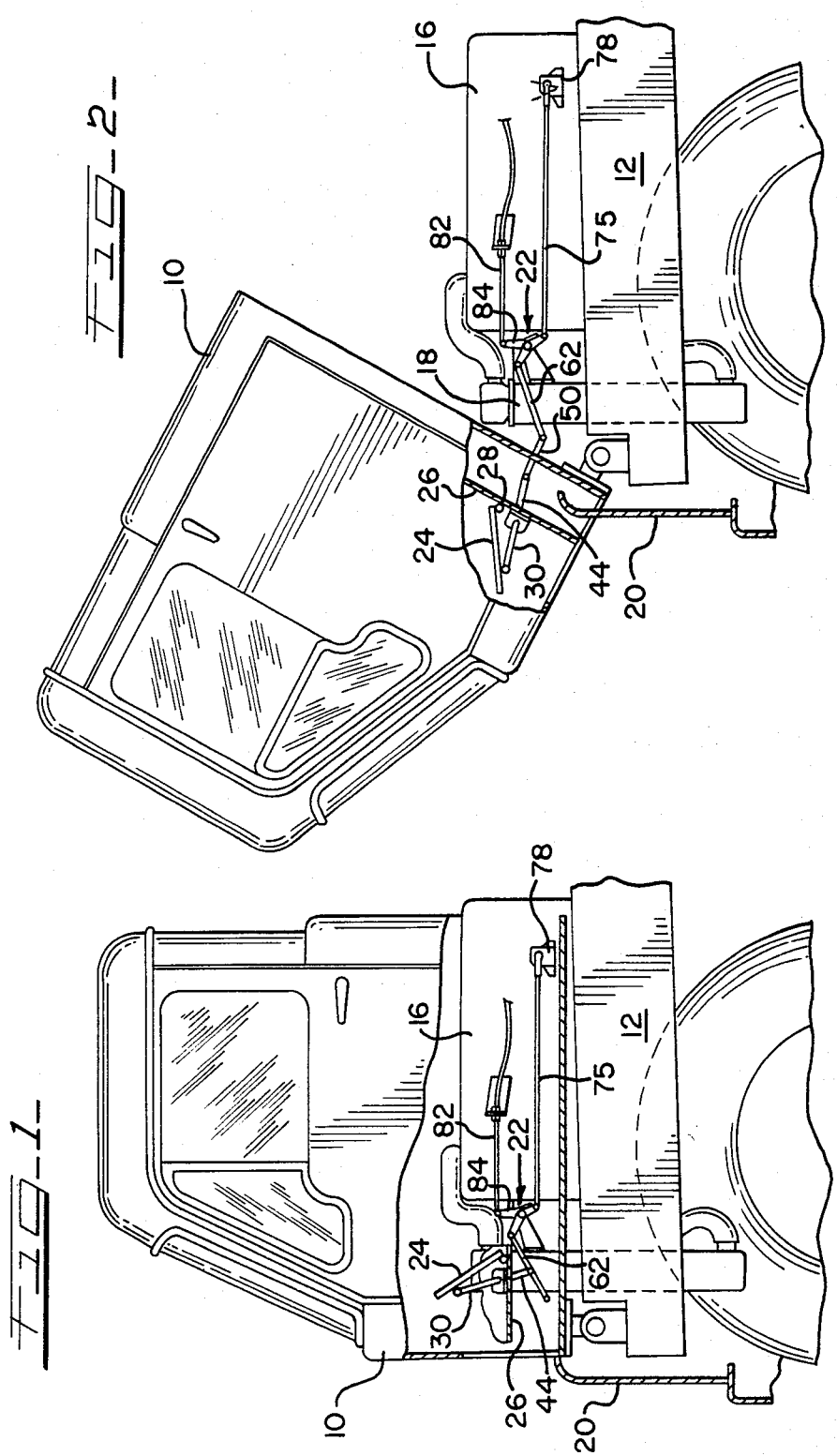

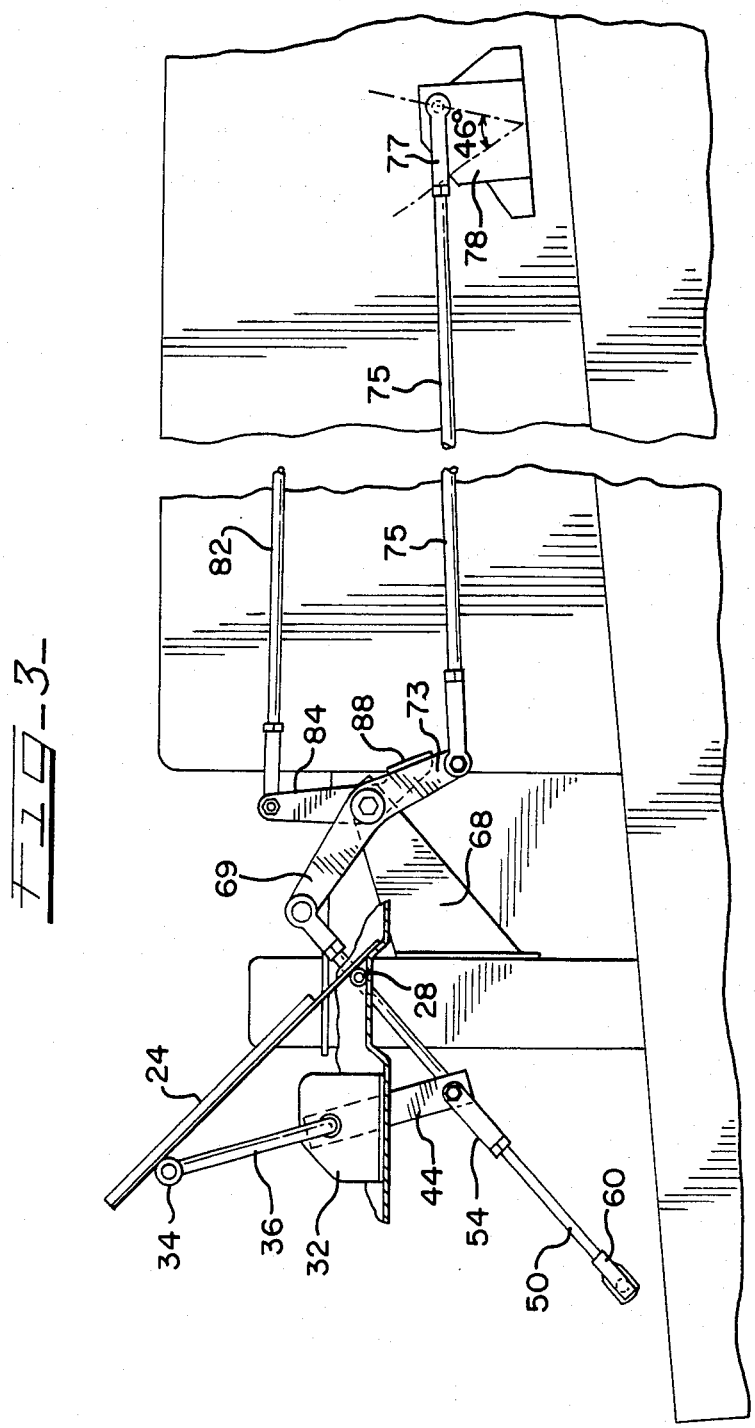

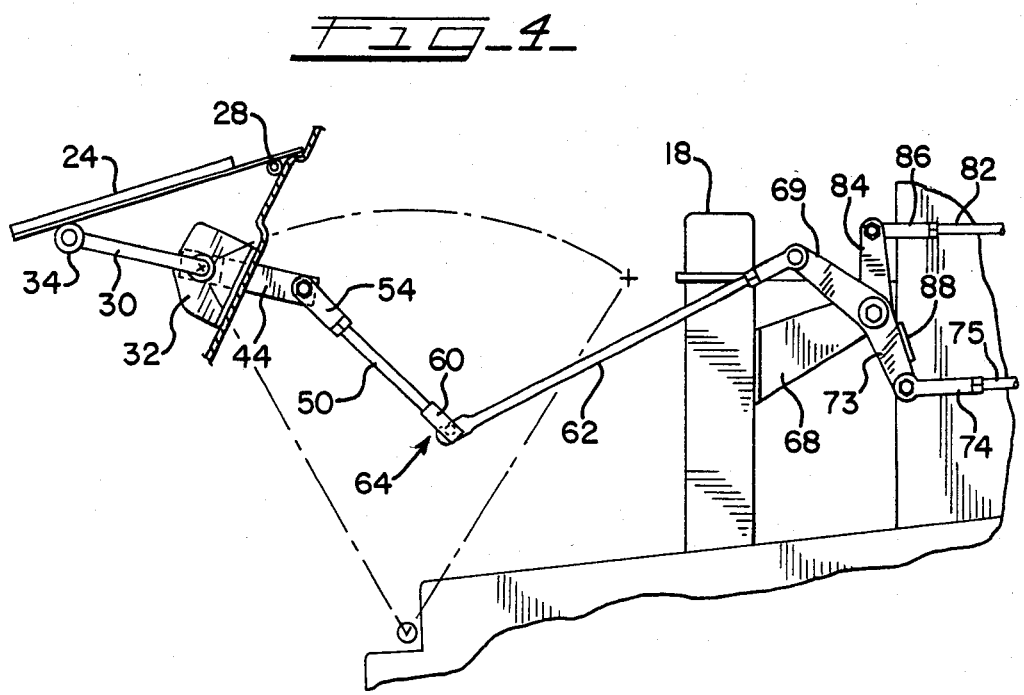

FOLDABLE THROTTLE CONTROL LINKAGE FOR A TILTABLE TRUCK CAB

BACKGROUND OF THE INVENTION

1. Field of the Invention

The present invention relates generally to throttle control linkages for motor vehicles having a tilt cab, and more particularly to such linkages which do not require any adjustment or disconnection to permit the tilting of the cab.

INFORMATION DISCLOSURE STATEMENT

Tilt cabs have been utilized in the past as a means for providing an access to certain vehicle components for making repairs and performing a routine maintenance. The tilting operation itself causes a change in the distance between the operator control element, located in the tilt cab, and the control element located in the non-tiltable vehicle portion. Conventionally, all linkages are positioned near engine means and within a limited space. During the normal operation of a motor vehicle, such as a truck, the chassis frame upon which an operator's compartment or cab is mounted is constantly subjected to a multitude of vibrations and shocks caused by road irregularities or uneven terrain. Hence, in an attempt to minimize or dissipate the transmission of such vibratory and road bed-generated shocks and forces to the cab the cab is resiliently supported on the chassis frame so as to limit relative movement between the cab and chassis frame. In a cab-over-engine motor truck the operator's cab is capable of pivoting between the normal lower, engine-enclosing position to a forwardly tilted, raised position so as to afford a convenient access to the engine. The fuel control device is affixed to a stationary or non-tiltable portion of the vehicle, such as an engine or chassis means, while the foot actuated accelerator pedal is mounted within the operator's compartment and is moveable therewith.

The below described subject invention provides a positive transfer of a control element, such as an accelerator foot pedal or the like, to a fuel control device in a cab lowered position and automatically unfolds without outside intrusion when the cab is tilted into its raised position.

SUMMARY OF THE INVENTION

According to the present invention, a motion transmitting linkage system interconnects an engine means mounted on a vehicle rigid frame and a cab pivotally carried by the frame. The linkage system comprises first control means disposed in the cab and moveable relatively thereof. A second control means is mounted on the engine means. A folding rod assembly interconnects the first and second control means. The cab tilts into its raised position together with the first control means from a lowered engine-enclosing position.

The rod assembly automatically folds away and/or folds down by a body translation from its collapsed position corresponding to the cab lowered position and to a fold-out position correlated to the cab raised position. The rod assembly interrupts the movement of the cab and the engine in unison, while permitting a positive communication between the first and second control means, in the collapsed position.

BRIEF DESCRIPTION OF THE DRAWINGS

FIG. 1 is a partially cross-sectional side view of a truck cab in its lowered engine-enclosing position;

FIG. 2 is a side view of the truck cab tilted into its raised position;

FIG. 3 is a side view of the motion transmitting linkage system in its collapsed position;

FIG. 4 is the linkage system shown in FIG. 3 in its fold out position; and

DESCRIPTION OF THE PREFERRED EMBODIMENT

Figure 5:
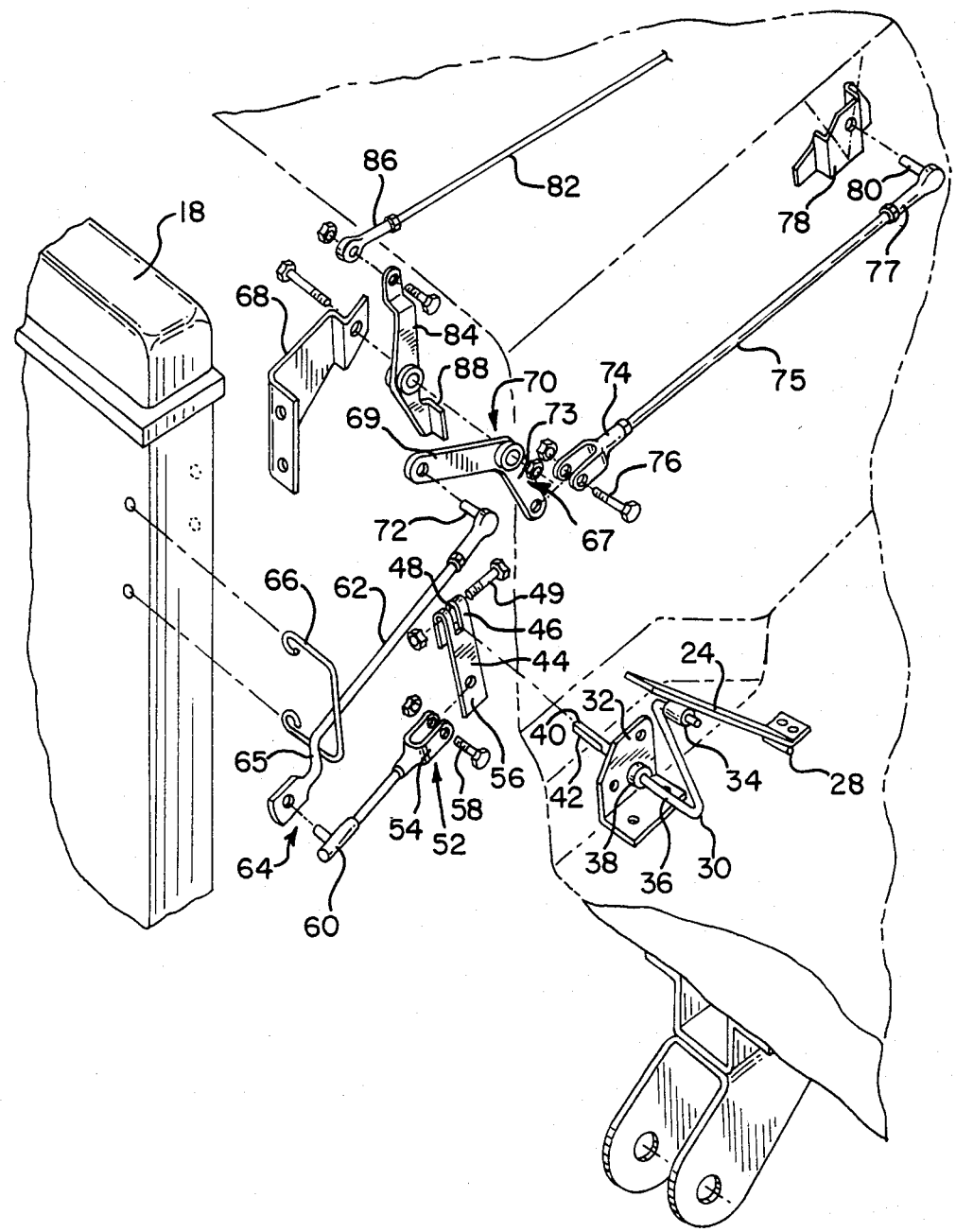
FIG. 5 is a perspective and illustrative view of the motion transmitting linkage system.

The invention may be carried into practice in a number of ways but one specific embodiment will be described by way of example only.

Referring now to the drawings wherein reference characters designate like or corresponding parts throughout the several views, there is shown in FIGS. 1 and 2 a front portion of a truck cab 10 rotatably secured to a truck frame or chassis 12 by a pivot mount 14. An engine means 16 including a radiator 18 is mounted on the frame 12 rearwardly of the front bumper 20.

A throttle control linkage system 22 includes a first control means comprising an accelerator foot pedal 24 secured to the cab floor 26 by a hinge joint 28. A Z-shaped crank arm 30 is rotatably attached to the cab by an angle bracket 32, as best shown in FIGS. 2-5. An upper leg 34 of the crank arm 30 contiguously abuts the pedal 24 and is moveable thereby. The lower leg 36 of the crank arm 30 journalled in the bearing 38 has its end 40 flattened by two parallel surfaces 42. The crank arm end 40 protrudes into the engine compartment through the cab structure and engages a toggle 44. The folded end 46 of the toggle 44 has a recess 48 adapted to snugly receive the flattened end 40 and retain it by a bolt 49. The toggle 44 is pivotally connected with a transfer rod 50 via a pivot joint 52 comprising a rod yoke end 54 coupled with the lower end 56 of the toggle 44 by a pin 58.

Another end 60 of the transfer rod 50 is rotatably secured with a short rod 62 by a pin joint 64. A longitudinal displacement of the short rod 62 is limited by its Z-shaped bend or shoulder 65 reactively engaging a retainer wire guide 66 screwed to the radiator 18.

A bell crank lever 67 is secured to the engine mounted bracket 68 by a pivot pin joint 70. The bell crank lever 67 has one prong 69 to the short rod 62 by a pivot pin 72 and another prong 73 to the yoke end 74 of a long rod 75 by a pivot pin 76. Another end 77 of the long rod 75 is coupled with a fuel pump lever 78 by a pin 80 extending sideways from the rod 75. The fuel pump lever 78 regulates the fuel supply to the engine thereby controlling the engine performance.

The fuel pump lever 78 may be also actuated by a hand throttle cable 82 originated in a cab (not shown) and pivotally attached to a lever 84 at 86. The lever 84 rotates about the pivot pin joint 70 and includes the side flange 88 overlapping and abutting the bell crank lever 66 for actuating thereof, as an alternative to the foot pedal 24.

In operation, a depression of the foot pedal 24 causes the rotation of the crank arm 30 about the angle bracket 32. This in turn actuates the rod assembly in its collapsed position corresponding to the lower, engine-enclosing position of the cab 10. The rod assembly affects the fuel pump lever 78 for controlling the engine performance in response to the accelerator pedal 24 depression. The motion of the pedal is transmitted through the bell crank to the toggle 44, which forces the transfer rod 50 to move the short rod 62. The short rod 62 correspondingly moves the long rod 74 in opposite direction by virtue of the bell crank 67 lever rotation about the joint 70. The long rod 74 reciprocally rotates the fuel pump lever 78.

When the cab 10 is tilted into its raised position the rod assembly automatically folds away into its fold-out position without disconnecting any part thereof. The pedal 24 and crank arm 30 mounted on the cab move therewith into the raised position. The toggle 44 displaced by the crank arm end 40 pulls the transfer rod 50 thereby causing the rotation thereof about pivot joint 64 in a counterclockwise motion. At the final stages of this counterclockwise displacement, the transfer rod pulls the short rod 62 thereby causing the long rod 74 to move the pump lever 78 into a predetermined position. In this position the engine will be either shut off or operate in an idle mode.

The scissor-like geometrical composition of the rod assembly elements in the collapsed position disrupts communication of vibrational impulses from the chassis frame 12 to the cab so as to prevent a simultaneous movement of the cab and engine means in unison, while transmitting positive movement from the pedal to the fuel pump lever.

One of the advantages of the subject invention is the ability of the throttle control link system to automatically collapse or fold out quickly and without any need for adjustment or disconnection thereof due to its geometrical resolution. The link system comprises simple elements which are easy to manufacture and maintain.

A simple rod and lever pivotal connections provide a positive remote control of the lever on the engine in compliance with the actuation of the accelerator control in the cab lowered position, while absorbing any vibration or hunting, imparted to the frame mounted engine means, by relative pivotal movements of the system components.

While one embodiment of the invention has been illustrated and described herein, various changes and modifications may be made therein without departing from the spirit of the invention as defined by the scope of the appended claims.

What is claimed is:

1. A motion transmitting linkage system interconnecting an engine means mounted on a vehicle rigid frame and a cab pivotally carried by said frame, comprising:
    first control means disposed in said cab and moveable relatively thereof;
    a second control means mounted on said engine means;
    a folding rod assembly interconnecting said first control means with said second control means and comprising a plurality of chain-like elements pivotally interlinked and guiding movement of said second means when said assembly is collapsed;
    said cab tiltable into its raised position together with said first control means from a lowered engine-enclosing position;
    said rod assembly being able to automatically and continually fold away or fold down by a body translation between its collapsed position corresponding to said cab lowered position and a fold-out position correlated to said raised position;
    said rod assembly preventing an oscillation of said cab and said engine in unison, while maintaining a positive communication between said first and second control means, in said cab lowered position.

2. The invention according to claim 1, and
    said first control means comprising an actuator;
    said second control means comprising a lever pivotally mounted on and affecting said engine means operation in response to said actuator displacement;
    said lever position corresponding to one mode of said engine means operation when said rod assembly is completely unfolded.

3. The invention according to claim 1, and
    said first control means comprising a pedal pivotally mounted to said cab and contiguous with a crank arm rotatably supported by said cab in said collapsed position of said elements and said fold-out position thereof.

4. The invention according to claim 2, and
    said rod assembly comprising first and second rods interconnected by a bell crank operatively supported by said engine means;
    said first rod secured to said lever and said second rod operatively connected with said first control means;
    said engine means comprising a radiator mounted bracket supporting said bell crank.

5. The invention according to claim 4, and
    said rod assembly comprising a transfer member pivotally secured to a toggle attached to said first control means and to said second rod.

6. The invention according to claim 1, and
    said first control means comprising a pedal and a crank arm pivotally moveable by and supporting one end of said pedal in said collapsed and fold-out positions of said rod assembly;
    said crank arm displacing one end of a toggle while another end thereof pushing a transfer member;
    said transfer member being operatively connected with said second control means for transmitting said pedal motion thereto.

7. The invention according to claim 6, and
    said pedal and crank arm secured to said cab and moveable therewith into said raised position;
    said toggle and transfer member following said cab movement and said second control means to move into a predetermined position.

8. A motion transmitting linkage system interconnecting an engine means mounted on a vehicle rigid frame and a cab pivotally carried by said frame, comprising:
    first control means disposed in said cab and moveable relatively thereof;
    a second control means mounted on said engine means;
    a folding rod assembly interconnecting said first control means with said second control means and comprising a system of chain-like elements pivotally linked and guiding operation of said second means when said system is collapsed or completely unfolded;
    said cab tiltable into its raised position together with said first control means from a lowered, engine-enclosing position;

said rod assembly being continually extendable by a body translation from its collapsed position corresponding to said cab lowered position to a fold-out position correlated to said raised position;

said first control means comprising a pedal pivotally mounted to said cab and contiguous with a crank arm rotatably supported by said cab;

said second control means comprising a lever pivotally moveable on said engine means and affecting said engine operation in response to said pedal displacement;

said rod assembly comprising first and second rods interconnected by a bell crank operatively supported by said engine means;

said engine means comprising a radiator and a mounting bracket attached thereto;

said first rod secured to said lever and said second rod operatively connected to said first control means;

said rod assembly comprising a transfer member pivotally secured to a toggle attached to said crank arm and to said second rod.

9. The invention according to claim 8, and said chain-like elements facilitating a reduction of cab vibration and hunting generated by road conditions and said engine means.

10. A motion transmitting linkage system interconnecting an engine means mounted on a vehicle rigid frame and a cab pivotally carried by said frame, comprising:

first control means disposed in said cab and moveable relatively thereof;

a second control means mounted on said engine means;

a folding rod assembly interconnecting said first control means with said second control means;

said cab tiltable into its raised position together with said first control means from a lowered engine-enclosing position;

said rod assembly being able to automatically and continually fold away or fold down by a body translation between its collapsed position corresponding to said cab lowered position and a fold-out position correlated to said raised position;

said rod assembly preventing an oscillation of said cab engine in unison, while maintaining a positive communication between said first and second control means, in said cab lowered position;

said first control means comprising a pedal and a crank arm rotatably supported by said cab and engageable thereby;

said crank arm rotating a toggle pivotally mounted with a transfer member;

said transfer member imparting said pedal displacement to a second rod interconnected with the first rod by a bell crank;

said first rod affecting said second control means displacement in said collapsed position;

said transfer member pulling said second rod and correspondingly moving said second control means in a predetermined position, when said cab moves into said raised position.

* * * * *